(12) United States Patent
Uchiyama

(10) Patent No.: US 7,885,534 B2
(45) Date of Patent: Feb. 8, 2011

(54) LIGHT-AMOUNT ADJUSTING SYSTEM AND OPTICAL APPARATUS

(75) Inventor: Minoru Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 11/856,106

(22) Filed: Sep. 17, 2007

(65) Prior Publication Data

US 2008/0074770 A1   Mar. 27, 2008

(30) Foreign Application Priority Data

Sep. 27, 2006  (JP) .............................. 2006-262564

(51) Int. Cl.
G03B 7/085 (2006.01)
(52) U.S. Cl. ..................... 396/257; 359/894
(58) Field of Classification Search ................. 396/170, 396/257, 235, 458, 470, 505, 213; 348/365
See application file for complete search history.

(56) References Cited

U.S. PATENT DOCUMENTS

| | | | | |
|---|---|---|---|---|
| 4,048,643 A | * | 9/1977 | Arita | ........................... 396/228 |
| 4,490,028 A | * | 12/1984 | Kucher | ........................... 396/8 |
| 4,843,297 A | * | 6/1989 | Landino et al. | ............. 318/811 |
| 4,998,129 A | * | 3/1991 | Watanabe et al. | ........... 396/260 |
| 5,282,075 A | * | 1/1994 | Sugimori | ..................... 359/227 |
| 5,293,241 A | * | 3/1994 | Song | .......................... 348/365 |
| 5,473,374 A | * | 12/1995 | Shimizu et al. | ............. 348/363 |
| 5,793,422 A | * | 8/1998 | Mochizuki et al. | .......... 348/296 |
| 5,809,438 A | * | 9/1998 | Noro et al. | ..................... 701/41 |
| 7,675,568 B2 | * | 3/2010 | Uchiyama | ................... 348/362 |

* cited by examiner

*Primary Examiner*—Christopher E Mahoney
*Assistant Examiner*—Linda B Smith
(74) *Attorney, Agent, or Firm*—Cowan, Liebowitz & Latman, P.C.

(57) ABSTRACT

The light-amount adjusting system includes a light-amount adjusting unit that changes a size of an aperture through which light passes, an actuator that drives the light-amount adjusting unit, and a detector that detects an aperture state of the light-amount adjusting unit. The system further includes a deviation signal generator that generates a signal corresponding to a deviation between a target aperture state of the light-amount adjusting unit and an aperture state thereof detected by the detector, a driving signal generator that provides an offset to the signal corresponding to the deviation to generate a driving signal for driving the actuator, and a filter which perform a low-pass-filter processing on the driving signal. An output from the filter is used as the offset. The system can control the light-amount adjusting unit with high stability and accuracy at any position and in any driving direction thereof.

4 Claims, 4 Drawing Sheets

LIGHT-AMOUNT ADJUSTING SYSTEM AND OPTICAL APPARATUS

BACKGROUND OF THE INVENTION

The present invention relates to a light-amount adjusting system that is provided in an optical apparatus such as a camera and an interchangeable lens.

A method for controlling an aperture stop (a light-amount adjusting apparatus or a light-amount adjusting unit) that is provided in an optical apparatus includes a position-servo-control method as shown in FIG. 4.

In FIG. 4, reference numeral 401 denotes an aperture control circuit, and reference numeral 402 denotes an aperture stop unit. When a target position is given to an aperture control circuit 401, a deviation that is a difference between the target position and an actual position (aperture position) of the aperture stop unit 402 is calculated. A phase and a gain of a signal indicating the deviation are adjusted by an LPF (Low Pass Filter) 403, a HPF (High Pass Filter) 404 and a gain circuit 405. Accordingly, a control signal adjusted to characteristics appropriate for the aperture stop unit 402 is generated.

An appropriate offset (OFFSET) is added to the control signal, and a limiter 406 sets a limit of a largest value and a smallest value for the added value. A PWM (Pulse Width Modulation) circuit 407 replaces the limited control signal with a PWM signal. The PWM signal is forwarded to a driver 408.

The driver 408 applies a current to a coil 409 in an aperture stop motor that drives the aperture stop unit 402 based on the PWM signal. Applying the current to the coil 409 moves a magnet 410 by an electromagnetic induction, thereby rotating a stop-blade-driving ring 411 to open/close a plurality of stop blades (light-shielding member)(not shown).

Since a change of a magnetic field associated with a movement of the magnet 410 is shown as a change of an electric signal from a hall element 412, the aperture position can be detected by the change of the electric signal. The electric signal is amplified to an appropriate value by a gain circuit 413, and used as an aperture position signal. The aperture position signal is used to generate a deviation signal showing the difference between the target position and the actual aperture position. Repeating these series of feedback operations for the aperture stop unit 402 gradually reduces the deviation, and thereby the aperture position is controlled to match the target position.

In the aperture stop unit 402, a biasing force of a spring 414 acts onto the driving ring 411 through the magnet 410 and a driving mechanism of the stop-blade-driving ring 411 in a direction of closing the stop blades.

The spring 414 provides a force to the driving ring 411 in a constant direction, thereby serving as a load component. Thus the force and torque generated by the coil 409 and the magnet 410 are readily well balanced, thereby reducing impact of disturbance from outside. In addition, the spring shields light to prevent the aperture position from easily changing when the power is off, and unnecessary light from entering.

Torque necessary for driving an aperture stop is calculated as follows. Torque T is generated in proportion to current i applied to the coil 409. When a torque coefficient is defined as K, T=Ki.

The torque T is in counterpoise with resultant forces of an inertia moment for indicating a level of difficulties about rotating a rotating member, a force caused by viscous resistance such as friction, and a force generated by the spring 414.

When the aperture position (rotating angle of an aperture stop motor) is defined as θ, the inertia force, the viscous resistance, and the biasing force of the spring 414 are in proportion to a two-time time-differential value, a one-time time-differential value, and a zero-time time-differential value, respectively.

When the inertia moment and a viscous resistance coefficient are respectively defined as J and D, a spring coefficient is defined as k, and an opening direction of the aperture stop is defined as a positive direction, a torque in the opening direction To and a torque in a closing direction Tc are expressed as follows:

$$T_o = Ki = J\frac{d^2\theta}{dt^2} + D\frac{d\theta}{dt} + k\theta$$

$$T_c = Ki = J\frac{d^2\theta}{dt^2} + D\frac{d\theta}{dt} - k\theta$$

As described above, the direction of the load generated by the spring 409 changes depending on the driving direction of the aperture stop. In addition, the amplitude of the load changes in proportion to the aperture position θ. An actual aperture stop includes resistive elements other than a spring which are caused by its shape and change depending on the aperture position and the driving direction thereof.

Japanese Patent Laid-Open No. 7-162741 has proposed a technique in which a negative feedback gain is changed according to a rotating direction of a motor, when a back electromotive force of an aperture stop motor is negatively feedbacked to generate a driving electric power of the motor.

As described above, a driving force necessary for controlling the aperture stop, i.e., a control characteristic changes depending on the aperture position or the driving direction. The control characteristic changes when members constituting the aperture stop changes according to a temperature change or a temporal change.

However, the conventional aperture stop is not controlled in response to those changes, thus controlling an aperture stop is unstable, and control accuracy is deteriorated.

A conventional method of generating a control signal by using the deviation between the target position and the detected position reduces the responsivity of the aperture stop in the opening direction due to the biasing force of the spring acting in the closing direction. Moreover, the force depending on the aperture position causes the aperture stop to fail to reach the target position at some aperture positions, resulting in causing a stationary deviation.

BRIEF SUMMARY OF THE INVENTION

The present invention provides a light-amount adjusting system where a light-amount adjusting unit can be controlled with high stability and accuracy at any position and in any direction of the light-amount adjusting unit.

As an aspect of the present invention, the light-amount adjusting system includes a light-amount adjusting unit that changes a size of an aperture through which light passes, an actuator that drives the light-amount adjusting unit, and a detector that detects an aperture state of the light-amount adjusting unit. The system further includes a deviation signal generator that generates a signal corresponding to a deviation between a target aperture state of the light-amount adjusting unit and an aperture state thereof detected by the detector, a driving signal generator that provides an offset to the signal corresponding to the deviation to generate a driving signal for driving the actuator, and a filter which perform a low-pass-filter processing on the driving signal. An output from the filter is used as the offset.

As another aspect of the present invention, the light-amount adjusting system includes a light-amount adjusting unit that changes a size of an aperture through which light passes, an actuator that drives the light-amount adjusting unit, and a detector that detects an aperture state of the light-amount adjusting unit. The system further includes a deviation signal generator that generates a signal corresponding to a deviation between a target aperture state of the light-amount adjusting unit and an aperture state thereof detected by the detector, a driving signal generator which provides an offset to the signal corresponding to the deviation to generate a driving signal for driving the actuator, and an offset setter that determines a direction of the deviation to change the offset according to the determined direction of the deviation.

Other objects and features of the present invention will become apparent from the following description and the attached drawings.

DETAILED DESCRIPTION OF THE PREFERRED EMBODIMENTS

Hereinafter, embodiments of the present invention will be described with reference to accompanying drawings.

Embodiment 1

Figure 1:
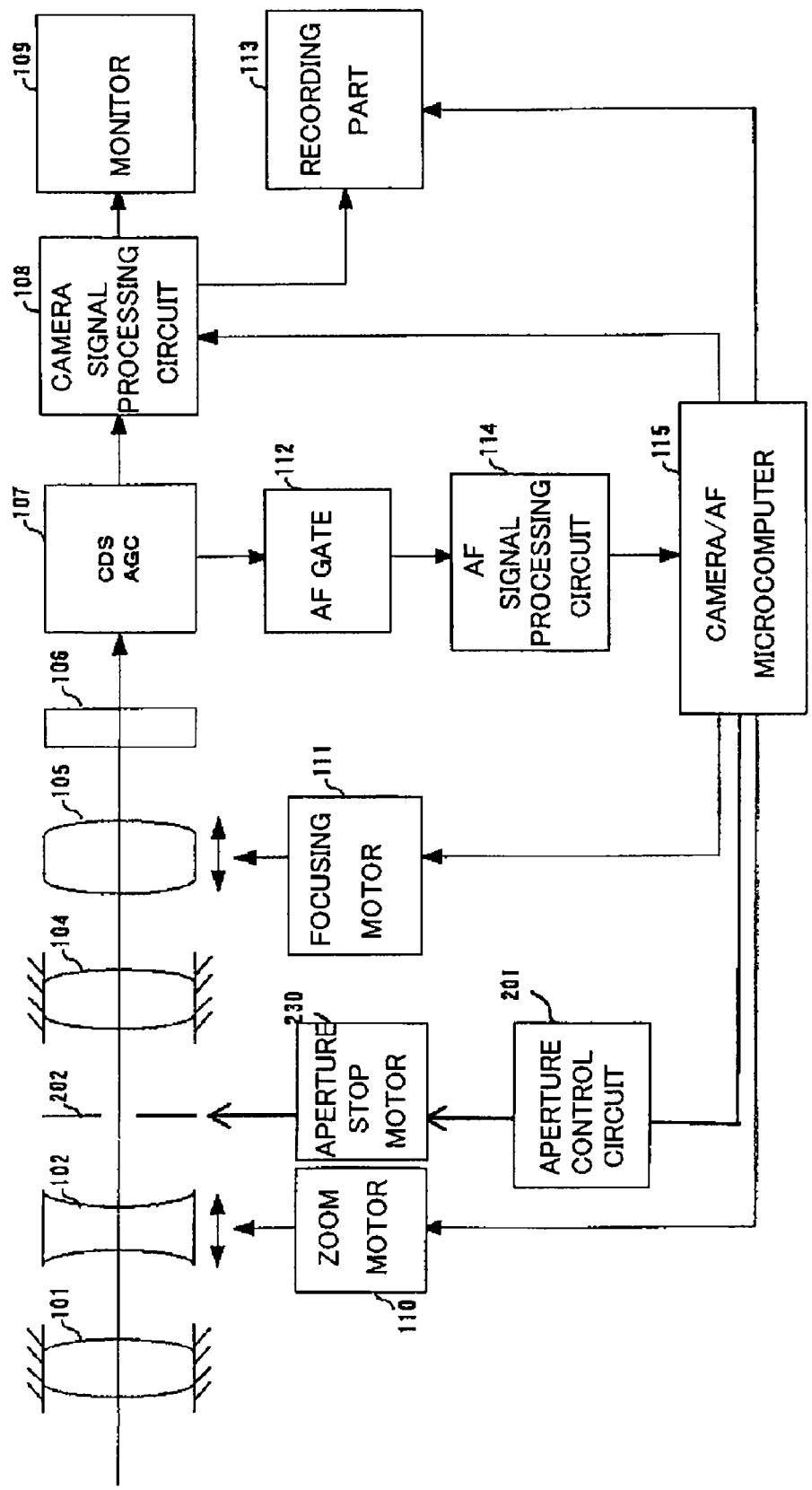
FIG. 1 is a block diagram that shows the configuration of a video camera that is Embodiment 1 of the present invention.

FIG. 1 shows the configuration of a video camera (an optical apparatus) that is Embodiment 1 of the present invention. Embodiment 1 describes a video camera, however, the present invention can also be applied for other optical apparatuses such as a digital still camera and an interchangeable lens.

In FIG. 1, reference numeral 101 denotes a first fixed lens, and 102 a magnification-varying lens that proceeds in an optical-axis direction to vary the magnification. Reference numeral 202 denotes an aperture stop unit as a light-amount adjusting unit. Reference numeral 104 denotes a second fixed lens, and 105 a focus compensator lens (hereinafter referred to as a focus lens) that has both functions of correcting movements of a focal plane associated with varying the magnification and of focusing. An image-pickup optical system is constituted by the first fixed lens 101, the magnification-varying lens 102, the aperture stop unit 202, the second fixed lens 104 and the focus lens 105.

Reference numeral 106 denotes an image-pickup element serving as a photoelectric conversion element that is constituted by a CCD sensor and a CMOS sensor. Reference numeral 107 denotes a CDS/AGC circuit that samples an output of the image-pickup element 106 to adjust its gain.

Reference numeral 108 denotes a camera signal processing circuit, which performs various kinds of image processing on an output signal from the CDS/AGC circuit in order to generate an image signal. Reference numeral 109 denotes a monitor constituted typically by an LCD, which displays the image signal from the camera signal processing circuit 108. Reference numeral 113 denotes a recording part, which records the image signal from the camera signal processing circuit 108 to a recording medium such as a magnetic tape, an optical disk and a semiconductor memory.

Reference numeral 110 denotes a zoom motor for moving the magnification-varying lens 102. Reference numeral 111 denotes a focusing motor for moving the focus lens 105. Reference numeral 230 denotes an aperture stop motor for driving the aperture stop unit 202. The aperture stop motor 230 operates upon receiving a signal from an aperture control circuit 201.

The zoom motor 110, the focusing motor 111 and the aperture stop motor 230 may be constituted by an actuator such as a stepping motor, a DC motor, a vibration-type motor and a voice coil motor.

Reference numeral 112 denotes an AF gate which passes only signals in a region used for a focus detection among output signals of all pixels from the CDS/AGC circuit 107.

Reference numeral 114 denotes an AF signal processing circuit. The AF signal processing circuit 114 extracts, for example, a high frequency component from the signal that has passed through the AF gate 112, and a luminance difference component (a difference between a largest value and a smallest value of the luminance level of the signal that has passed through the AF gate 112) generated from the high frequency component, to generate an AF evaluation value signal serving as first information.

The AF evaluation value signal is output to a camera/AF microcomputer 115. The AF evaluation value signal shows sharpness (contrast) of an image generated based on the output signal from the image-pickup element 106. The sharpness changes depending on a focus state of the image-pickup optical system, so that the AF evaluation value signal shows the focus state of the image-pickup optical system.

The camera/AF microcomputer (hereinafter simply referred to as the microcomputer) 115 governs the control of all operations of the video camera and also performs a focus control by controlling the focusing motor 111 based on the AF evaluation value signal.

Figure 2:
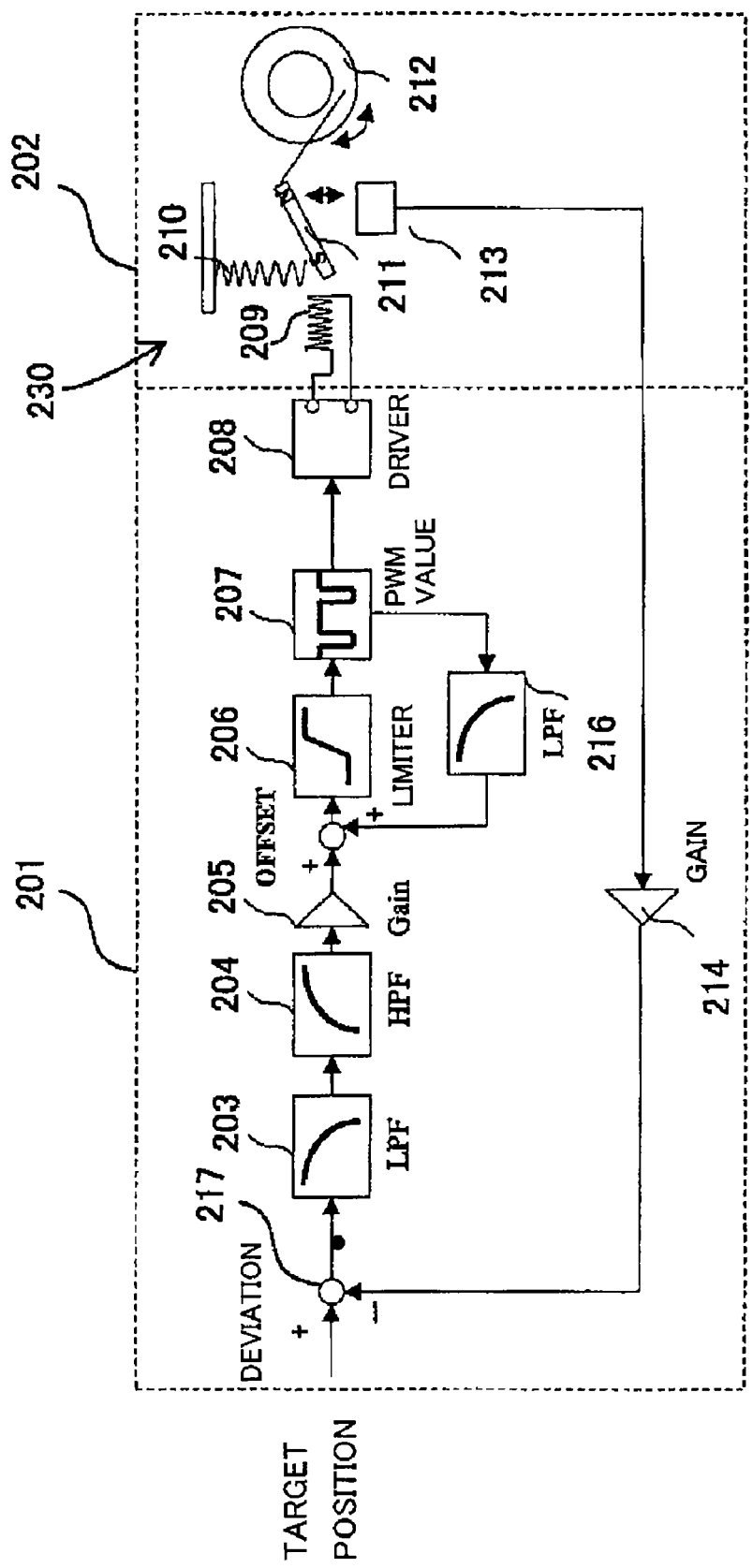
FIG. 2 is a block diagram that shows the configuration and the operation of an aperture stop system in Embodiment 1.

FIG. 2 shows the configuration of the aperture stop system (light-amount adjusting system) of the present embodiment, the aperture stop system being controlled by a positioning servo. Reference numerals 201 and 202 denote the aperture control circuit and the aperture stop unit, respectively. The aperture stop unit 202 changes the size of an aperture (stop aperture) through which light passes by moving a plurality of light-shielding members (not shown) in opening/closing directions, to adjust the amount of light.

When a target position is given to the aperture control circuit 201, a deviation-signal-generating part 217 calculates a deviation that is a difference between the target position and an actual aperture position of the aperture stop unit 202. The position of the aperture stop unit 202 (hereinafter simply referred to as the aperture position) corresponds to an aperture state of the aperture stop unit 202, which is determined by a rotating angle of the aperture stop motor 230 or an opening/closing position of stop blades (not shown).

A phase and a gain of a signal indicating the deviation are adjusted by an LPF (Low Pass Filter) 203, a HPF (High Pass Filter) 204 and a gain circuit 205. Accordingly, a control signal adjusted to characteristics appropriate for the aperture stop unit 202 is generated.

An offset (OFFSET), later described, is added to the control signal corresponding to the deviation. A limiter 206 sets a limit of a largest value and a smallest value for the added value. A PWM circuit 207 replaces the limited control signal with a PWM (Pulse Width Modulation) signal serving as a driving signal. The PWM signal is forwarded to a driver 208. Circuits from the LPF 203 to the PWM circuit 207 constitute a driving signal generator.

The driver 208 applies a current to a coil 209 in the aperture stop motor 230 that drives the aperture stop unit 202 based on the PWM signal. Applying the current to the coil 209 moves a magnet 211 by an electromagnetic induction, thereby rotating a stop-blade-driving ring 212 to open/close a plurality of stop blades (light-shielding member)(not shown).

Since a change of a magnetic field associated with a movement of the magnet 211 is shown as a change of an electric signal from a hall element 213 serving as a detector, the aperture position can be detected by the change of the electric signal. The electric signal is amplified to an appropriate value by a gain circuit 214, and used as an aperture position signal. The aperture position signal is used to generate a deviation signal showing a difference between the target position and the actual aperture position. Repeating these series of feedback operations for the aperture stop unit 202 gradually reduces the deviation, and thereby the aperture position is controlled to match the target position.

In the aperture stop unit 202, a biasing force of a spring 210 acts onto the driving ring 212 through the magnet 211 and a driving mechanism of the stop-blade-driving ring 212 in a direction of closing the stop blades. The spring 210 is a biasing member for biasing the stop-blade-driving ring 212 in the direction of closing the stop blades.

A control processing for the aperture stop used in the video camera is generally slower than that for AF, image stabilization, zooming and the like. The target position is changed slowly and the aperture stop tends to continuously operate in a constant direction so that a luminance does not change too rapidly for user's eyes. Therefore, the PWM signal on which an LPF processing is performed can be used as a signal substantially proportional to the aperture position.

In Embodiment 1, the PWM signal is input into an LPF circuit 216 to generate a delayed signal, which is used as an offset that is to be added to the control signal. Accordingly, a force depending on the aperture position can be canceled to restrict the force depending on the aperture position from remaining as a force causing a stationary deviation.

It may be possible to detect the aperture position based on an output from the hall element 213 or the current applied to the coil 209, and record a value adjusted to the aperture position as an offset value for every aperture position. In this processing, however, the recorded offset value may eventually be inappropriate due to the temporal change and the temperature change, thereby decreasing control accuracy.

In contrast, this embodiment uses a dynamically-changing result of the LPF processing of the control signal as the offset, which can dynamically respond to the temporal change and the temperature change.

As described above, according this embodiment, the aperture stop unit 202 can be stably controlled with high accuracy at any aperture position.

Embodiment 2

Figure 3:
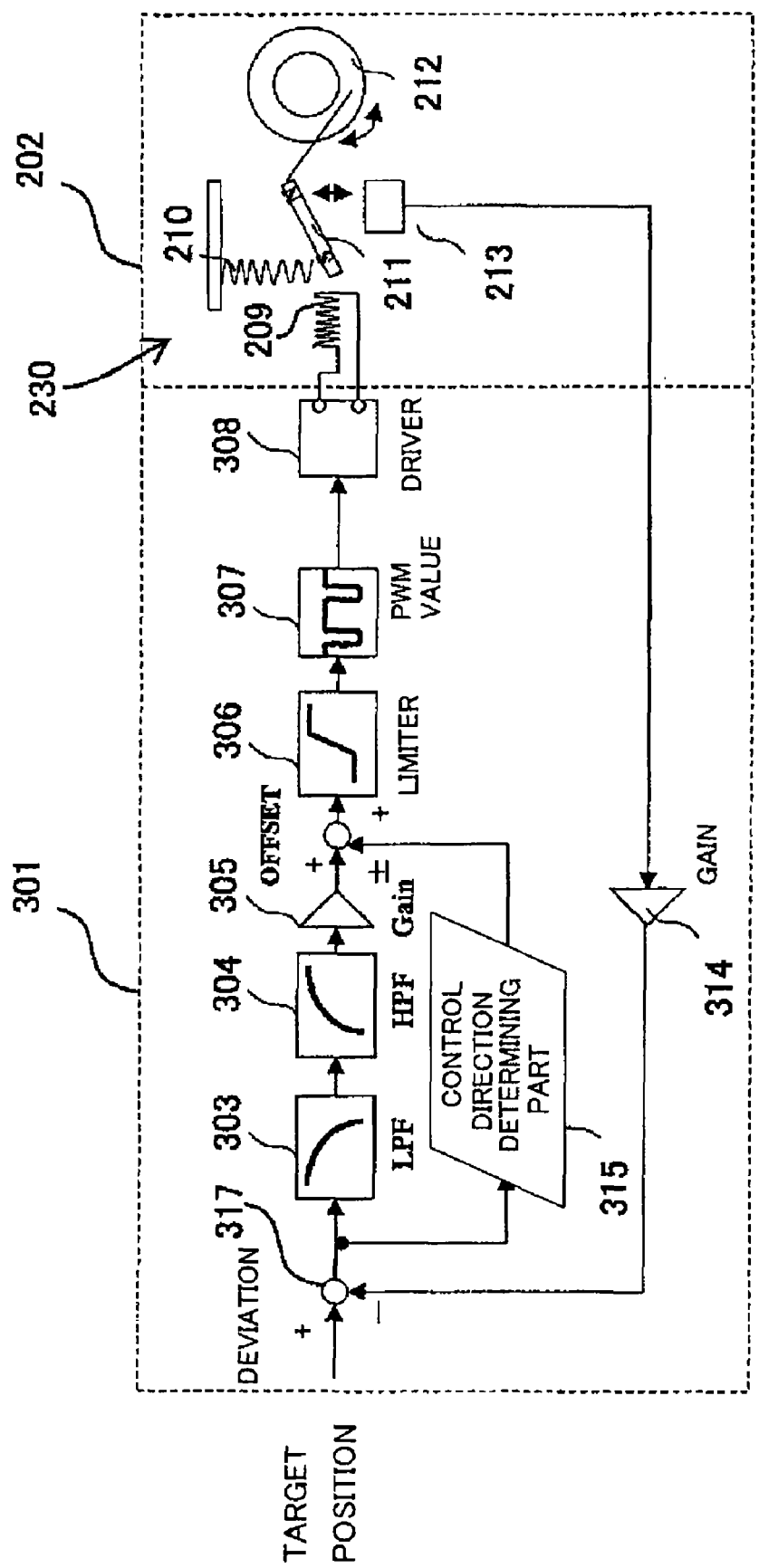
FIG. 3 is a block diagram that shows the configuration and the operation of an aperture stop system that is Embodiment 2 of the present invention.
Figure 4:
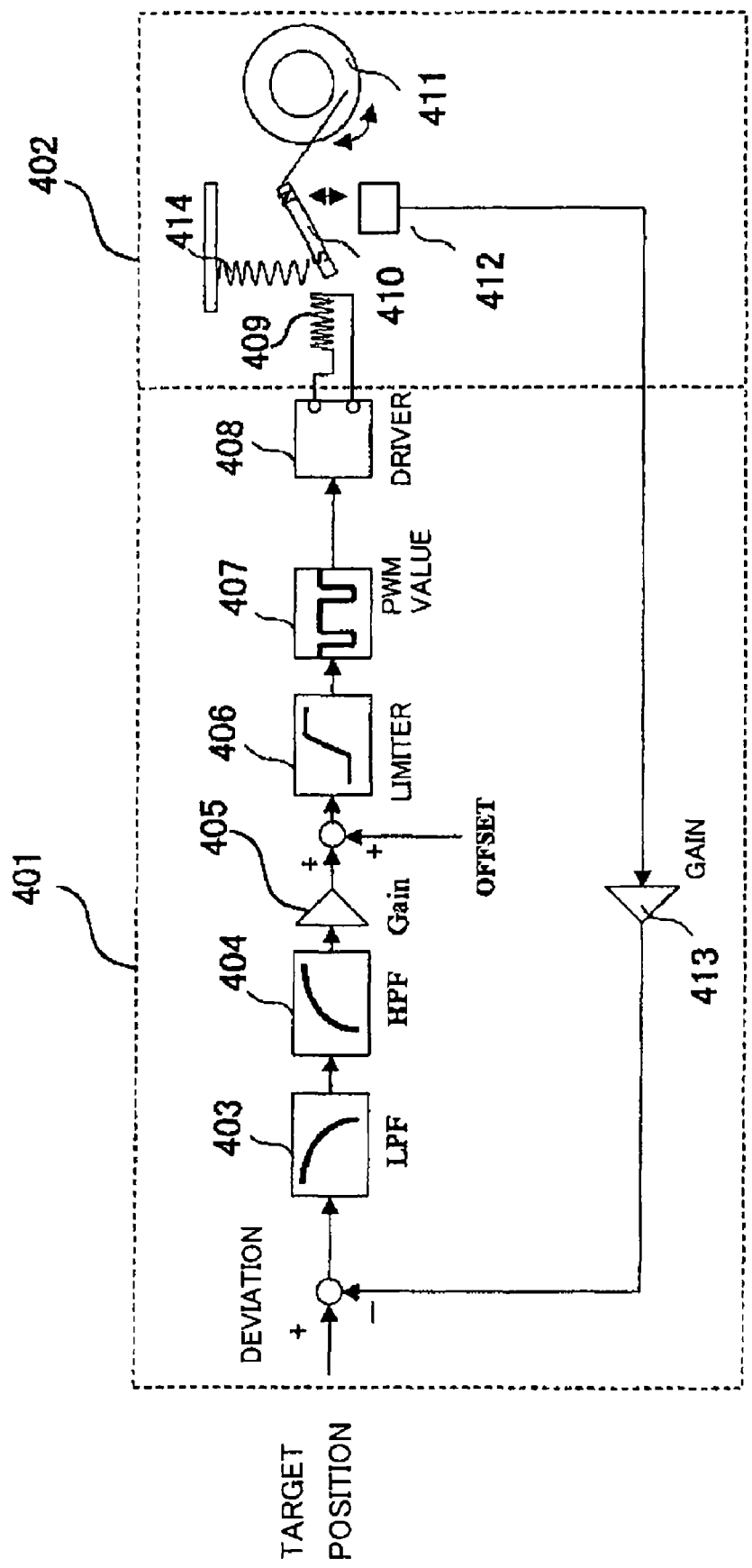
FIG. 4 is a block diagram that shows the configuration and the operation of a conventional aperture stop system.

FIG. 3 shows the configuration of an aperture stop system that is Embodiment 2 of the present invention. This aperture stop system is also provided in a video camera and the like described in Embodiment 1 (FIG. 1).

Reference numeral 301 denotes an aperture control circuit, and 202 an aperture stop unit that is the same as that in Embodiment 1.

When a target position is given to the aperture control circuit 301, a deviation that is a difference between the target position and an actual position (aperture position) of the aperture stop unit 202 is calculated. A phase and a gain of a signal indicating the deviation are adjusted by an LPF (Low Pass Filter) 303, a HPF (High Pass Filter) 304 and a gain circuit 305. Accordingly, a control signal adjusted to characteristics appropriate for the aperture stop unit 302 is generated.

An offset (OFFSET), later described, is added to the control signal corresponding to the deviation, and a limiter 306 sets a limit of a largest value and a smallest value for the added value. A PWM circuit 307 replaces the limited control signal with a PWM (Pulse Width Modulation) signal serving as a driving signal. The PWM signal is forwarded to a driver 308.

The driver 308 applies a current to the coil 209 in the aperture stop motor 230 that drives the aperture stop unit 202 based on the PWM signal. Applying the current to the coil 209 moves the magnet 211 by an electromagnetic induction, thereby rotating the stop-blade-driving ring 211 to open/close a plurality of stop blades (light-shielding member)(not shown).

Since a change of a magnetic field associated with a movement of the magnet 211 is shown as a change of an electric signal from the hall element 213, the aperture position can be detected by the change of the electric signal. The electric signal is amplified to an appropriate value by a gain circuit 314, and used as an aperture position signal. The aperture position signal is used to generate a deviation signal showing a difference between the target position and the actual aperture position. Repeating these series of feedback operations for the aperture stop unit 202 gradually reduces the deviation, and thereby the aperture position is controlled to match the target position.

In the aperture stop unit 202, a biasing force of a spring 210 acts onto the driving ring 212 through the magnet 211 and a driving mechanism of the stop-blade-driving ring 212 in a direction of closing the stop blades.

As described in "BACKGROUND IN THE INVENTION", a torque necessary for operating the aperture stop unit 202 differs depending on the driving direction thereof. In other words, when an inertia moment and a viscous resistance coefficient are respectively defined as J, D, a spring coefficient is defined as k, and an opening direction of the aperture stop is defined as a positive direction, a torque To in an opening direction and a torque Tc in a closing direction are expressed as follows.

$$T_o = Ki = J\frac{d^2\theta}{dt^2} + D\frac{d\theta}{dt} + k\theta$$

$$T_c = Ki = J\frac{d^2\theta}{dt^2} + D\frac{d\theta}{dt} - k\theta$$

The opening direction of the aperture stop is defined as a positive direction.

In this embodiment, a control-direction-determining part 315 is provided for detecting a sign (positive/negative) of the deviation signal. The driving direction (control direction) of the aperture stop unit 202 is the opening direction, when the deviation signal indicates negative. The driving direction of the aperture stop unit 202 is the closing direction, when the deviation signal indicates positive.

The control direction determining part 315 serving as an offset setter adds a specified offset to the control signal, when the control direction is the opening direction, while it subtracts a specified offset from the control signal (that is, adds a negative offset), when the control direction is the closing direction. Thus, a force depending on the driving direction of the aperture stop unit 202 can be corrected. This processing in servo operation can solve the problem in which the responsivity of the aperture stop unit 202 changes depending on the control direction thereof.

As described above, according to each of Embodiments 1 and 2, giving (adding to) the driving signal the result of the low pass filter processing performed on the driving signal can suppress the force depending on the aperture state (position) of the light-amount adjusting unit from remaining as the stationary deviation. In other words, the force depending on the position of the light-amount adjusting unit can be corrected.

Further, since each embodiment does not use a value corresponding to the detected result of the position of the light-amount adjusting unit as the offset, but uses the result of the low pass filter processing performed on the driving signal, highly-accurate control can be maintained even if a temperature change or a temporal change occurs.

Moreover, in each embodiment, since the offset is changed depending on the direction of the deviation (that is, the driving direction) for the target position of the light-amount adjusting unit, the force depending on the driving direction can be corrected. This processing in servo operation can solve the problem in which the responsivity of the light-amount adjusting unit changes depending on the control direction thereof.

According to each of these embodiments, the light-amount adjusting unit can be controlled with stability and high accuracy at any aperture state thereof and in any driving direction thereof.

In each embodiment, a microcomputer may perform a digital calculation processing as the operation of the aperture control circuit according to a computer program.

Furthermore, the present invention is not limited to these preferred embodiments and various variations and modifications may be made without departing from the scope of the present invention.

This application claims foreign priority benefits based on Japanese Patent Application No. 2006-262564, filed on Sep. 27, 2006, which is hereby incorporated by reference herein in its entirety as if fully set forth herein.

What is claimed is:

1. A light-amount adjusting system comprising:
a light-amount adjusting unit configured to change a size of an aperture through which light passes, the light-amount adjusting unit including a biasing member biasing a light-shielding member that changes the size of the aperture, in one of an aperture opening direction and an aperture closing direction;
an actuator configured to drive the light-amount adjusting unit;
a detector configured to detect an aperture state of the light-amount adjusting unit;
a deviation signal generator configured to generate a signal corresponding to a deviation between a target aperture state of the light-amount adjusting unit and an aperture state thereof detected by the detector;
a driving signal generator configured to provide an offset to the signal corresponding to the deviation to generate a driving signal for driving the actuator; and
a filter configured to perform low-pass-filter processing on the driving signal,
wherein an output from the filter is used as the offset.

2. An optical apparatus comprising a light-amount adjusting system according to claim 1.

3. A light-amount adjusting system comprising:
a light-amount adjusting unit configured to change a size of an aperture through which light passes, the light-amount adjusting unit including a biasing member biasing a light-shielding member that changes the size of the aperture, in one of an aperture opening direction and an aperture closing direction;
an actuator configured to drive the light-amount adjusting unit;
a detector configured to detect an aperture state of the light-amount adjusting unit;
a deviation signal generator configured to generate a signal corresponding to a deviation between a target aperture state of the light-amount adjusting unit and an aperture state thereof detected by the detector;
a driving signal generator configured to provide an offset to the signal corresponding to the deviation to generate a driving signal for driving the actuator; and
an offset setter configured to determine a direction of the deviation to change the offset on the basis of the determined direction of the deviation
wherein the offset setter changes the offset between a positive value and a negative value on the basis of a relationship between the direction of the deviation and a direction in which the light-shielding member is biased by the biasing member such that a force depending on a driving direction of the light-amount adjusting unit is corrected.

4. An optical apparatus comprising a light-amount adjusting system according to claim 3.

* * * * *